United States Patent [19]

Sumerford et al.

[11] Patent Number: 4,620,568
[45] Date of Patent: Nov. 4, 1986

[54] VEHICLE OFF ROAD FUEL USE INDICATOR

[76] Inventors: Harold A. Sumerford, P.O. Box 173, Milledgeville, Ga. 31061; Melvin R. Collins, Rte. 2, Box 72, Ellaville, Ga. 31806

[21] Appl. No.: 785,753

[22] Filed: Oct. 9, 1985

[51] Int. Cl.[4] .............................................. F16K 27/08
[52] U.S. Cl. .................................. 137/899.4; 137/255; 137/382; 137/563; 417/380; 123/515; 180/314
[58] Field of Search ................ 417/380; 123/510, 515, 123/575; 180/314; 137/255, 899.4, 382, 563

[56] References Cited

U.S. PATENT DOCUMENTS

| 2,304,276 | 12/1942 | Peckworth | 180/314 |
| 2,639,723 | 5/1953 | Bierman et al. | 137/382 |
| 2,940,435 | 6/1960 | Nemec et al. | 123/575 |
| 3,270,495 | 9/1966 | Connor | 417/380 |
| 3,288,238 | 11/1966 | Lindsey | 180/314 |
| 3,512,600 | 5/1970 | Adams | 180/314 |
| 4,287,908 | 9/1981 | Storgard | 180/314 |

FOREIGN PATENT DOCUMENTS

| 2510660 | 2/1983 | France | 180/314 |
| 986166 | 3/1965 | United Kingdom | 180/314 |
| 1441498 | 6/1976 | United Kingdom | 417/380 |

Primary Examiner—A. Michael Chambers
Attorney, Agent, or Firm—Harvey B. Jacobson

[57] ABSTRACT

A fuel flow diverting system is provided for a diesel engine powered vehicle including an auxiliary power system driven from the engine of the vehicle when the latter is stationary and wherein the vehicle is provided with primary and secondary fuel tanks with fuel supply and return lines being provided for each tank. The fuel diverting system is operative when the auxiliary power system is not operating and the vehicle is being operated in an over-the-road mode, to draw engine fuel from and return excess engine fuel to the primary tank. The fuel diverting system is further operative, when the vehicle is stationary and the auxiliary power system drivable when the vehicle engine is actuated, to supply fuel to the engine from the auxiliary fuel tank only and to return fuel from the engine to the auxiliary fuel tank only.

8 Claims, 3 Drawing Figures

4,620,568

VEHICLE OFF ROAD FUEL USE INDICATOR

BACKGROUND OF THE INVENTION

1. Field of the Invention

This invention relates to a system whereby a combustion engine driven vehicle including an auxiliary drive may draw fuel for the combustion engine from a primary fuel tank when the vehicle is being operated over the road, but including an auxiliary fuel tank from which fuel is drawn for the engine only when the auxiliary drive is being operated and the truck is not being operated over the road.

2. Description of Related Art

Various different forms of fuel flow controlling systems heretofore have been provided such as those disclosed in U.S. Pat. Nos. 2,304,276, 3,288,238, 3,512,600 and 4,287,908.

U.S. Pat. No. 3,288,238 discloses a fuel diversion system incorporating some of the features of the instant invention including primary and secondary auxiliary fuel tanks and means for normally supplying fuel to an associated engine from the primary fuel tank and operative to supply fuel from the secondary or auxiliary fuel tank to the engine only when the vehicle is stationary. However, this prior patent discloses a single diversion valve which may in fact develop internal leaks and allow the crossing of fuel from one tank to another. Further, the prior patent device also includes control means for the fuel diversion valve which is not operative only in response to actuation of the auxiliary drive and may, in fact, be actuated when the vehicle is stationary and the auxiliary drive is not in operation.

SUMMARY OF THE INVENTION

The instant invention incorporates a fuel diversion system wherein a combustion engine powered vehicle equipped with primary and auxiliary fuel tanks and an engine driven auxiliary power system operational only when the vehicle is stationary receives fuel for the vehicle engine from the primary fuel tank during normal over the road operation of the vehicle and receives fuel from the auxiliary fuel tank only when the vehicle is stationary and the auxiliary power system is actuated, the switch over of fuel from the primary tank to the auxiliary tank being effected only by the actuation of the control for the auxiliary power system.

The main object of this invention is to provide a fail safe manner of switching from a primary fuel tank to an auxiliary fuel tank only when the combustion engine prime mover of a stationary vehicle is drivingly coupled to an auxiliary power system to thereby enable fuel usage during operation of the auxiliary power system to be fully monitored for the purpose of exclusion from Federal and State Road Taxes.

Another object of this invention is to provide a fuel diversion system incorporating fuel supply switching valve means which will positively prevent cross feed of fuel from one tank to the other or major fuel flow from one tank and partial fuel flow from the other tank.

Still another important object of this invention is to provide a fuel diversion system which also will be operative in conjunction with a vehicle utilizing a diesel engine as a prime mover and wherein the diesel engine is equipped with not only a fuel inlet but also a fuel outlet for return of excess fuel supplied to the engine back to the same fuel tank from which fuel is being drawn to the engine.

Still another object of this invention is to provide a fuel diversion system including operating features and control means therefor which may be completely enclosed within a locked housing therefor.

A final object of this invention to be specifically enumerated herein is to provide a fuel diversion system in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
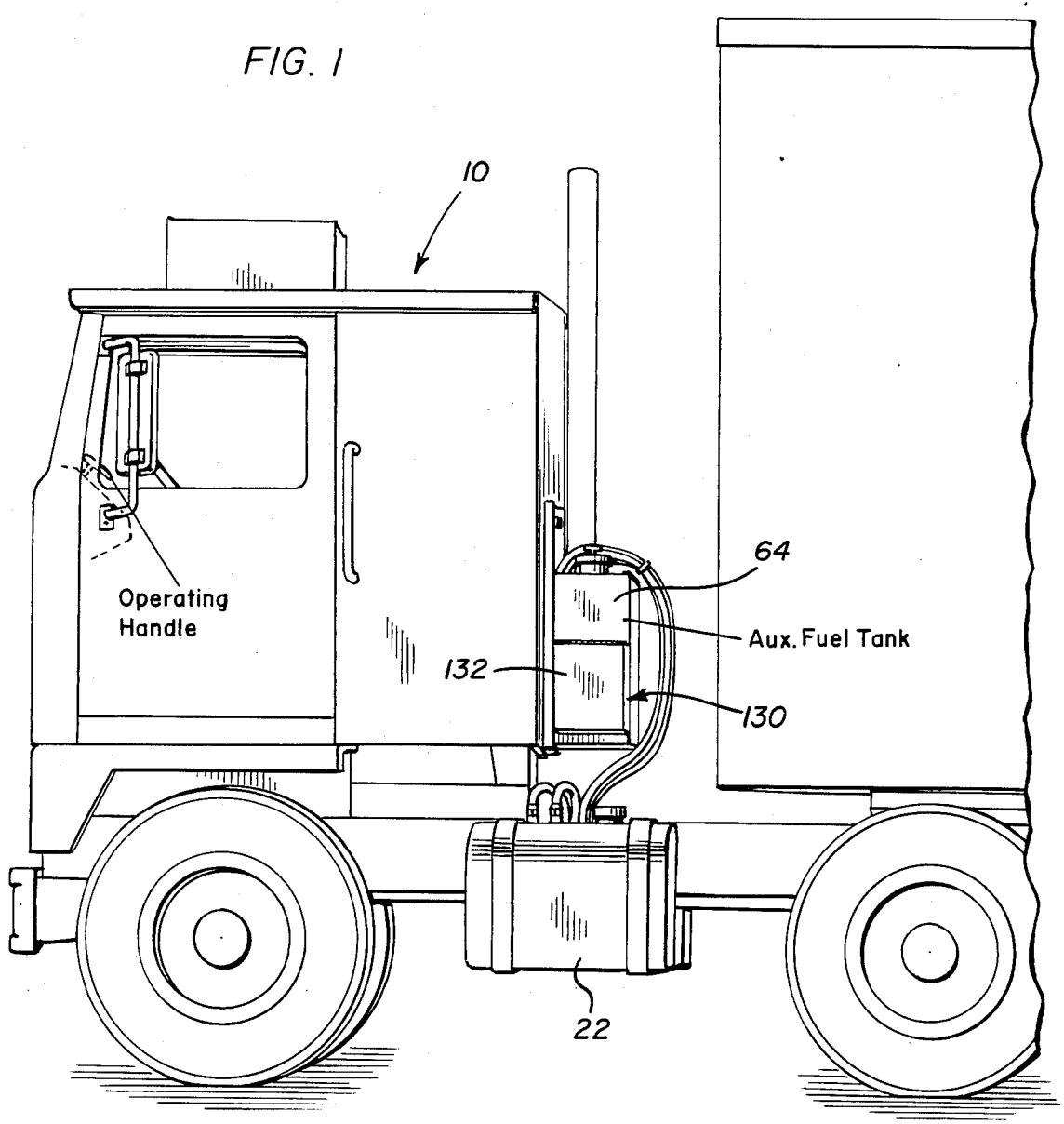
FIG. 1 is a fragmentary perspective view of a diesel engine powered tractor with which the fuel diversion system of the instant invention has been operatively associated.

Referring now more specifically to the drawings, the numeral 10 generally designates a motor vehicle in the form of a diesel engine powered tractor. The tractor 10 is driven by a diesel engine referred to by the reference numeral 12 including a fuel inlet 14 and a fuel return 16. In addition, the engine 12 includes an external lubricating oil outlet and an external lubricating oil return.

Also, the tractor 10 further includes a pair of saddle tanks 22 supported from opposite sides thereof and together comprising a primary fuel tank 24. Further, the tractor 10 is equipped with an air compressor referred to in general by the reference numeral 26 including an input turbine 28 designed to be driven by exhaust gases from the engine 12 and an output turbine 30 for pumping air. The compressor 26, when operated, receives lubricating oil from the engine 12 through a line 32 extending from the outlet 18 to the compressor 26 as at 34 and the lubricating oil supplied to the compressor 26 is returned therefrom as at 36 through line 38 to the return 20. Still further, the tractor 10 includes an operating handle 40 for simultaneously opening an oil flow control valve 42 interposed in the line 32 and diverting engine exhaust gases from the engine 12 to the compressor 26.

All of the foregoing comprises conventional structure and it may further be seen that the fuel inlet 14 includes an inline fuel filter 44 and a fuel pump 46. Also, the fuel inlet is conventionally communicated directly with the fuel outlet 48 of the primary tank 24 and the return 16 is conventionally connected to the return 50 of the primary tank 24.

The fuel diversion system of the instant invention is referred to in general by the reference numeral 52 and includes a pressurestat 54 including a pressure inlet 56, a relay 58, a pair of solenoid actuated valves 60 and 62 and an auxiliary fuel tank 64 including an outlet 66 and a return 68.

A first pair of supply lines 70 and 72 extend from the outlets 48 and 66, respectively, to a pair of inlets 74 and 76 of the valve 60, the fuel inlet 14 being connected to the outlet 78 of the valve 60. In addition, a pair of return lines 80 and 82 extend from the outlets 84 and 86 of the valve 62 to the returns 50 and 68 of the tanks 24 and 64, the return 16 for fuel for the engine 12 being connected to the inlet 88 of the valve 62.

A supply conductor 90 extends from the battery 92 of the tractor 10 to a pair of branch conductors 94 and 96 and has a circuit breaker 98 serially connected therein. The conductor 94 extends to the input terminal 100 for the solenoid of the relay 58, the latter being grounded as at 102 and the conductor 94 has the normally open switch terminals 104 and 106 of the pressurestat 54 serially connected therein. The conductor 96 extends from the conductor 90 to the input switch terminal 108 of the relay 58 and a conductor 110 extends from the switch output terminal 112 of the relay 58 to the input terminals 112 and 114 of the solenoid actuated valves 60 and 62, the valves being grounded as at 116 and 118.

Further, the line 32 includes a T-fitting 120 therein from which a pressure line 122 extends to the inlet 56 of the pressurestat 54. Also, the operating handle 40 not only controls the valve 40 but also diverts engine exhaust gases to the input turbine 28 of the compressor 26, as is conventional.

In operation, when the tractor 10 is being used in an over the road situation, the operating handle 40 is in a position in which the oil valve 42 is closed and the exhaust from the engine 12 is not diverted to the compressor 26. The pressurestat switch is normally open as is the switch of the relay 58 which bridges the terminals 108 and 112 when the relay is actuated. Accordingly, during operation of the tractor 10 in an over-the-road situation, the valves 60 and 62 are in their normal positions in which communication between the line 70 and the fuel inlet 14 is maintained, communication between the line 72 and the inlet 14 is blocked, communication between the return 16 and the return line 80 is maintained and communication between the return 16 and the return line 82 is blocked. However, when the tractor 10 is stationary and the handle 10 is actuated to divert engine exhaust gases to the turbine 28 to thus actuate the auxiliary power system comprising the compressor turbine 30, the valve 42 is opened and engine oil under pressure passes through the line 32 to the compressor 26 as at 34 and exits therefrom as at 36 for return through the line 38 to the return 20. Also, the engine oil pressure is communicated with the pressurestat inlet 56 through line 122 and the pressure switch 54 is closed and therefore bridges the terminals or contacts 104 and 106 to electrically connect the battery 92 to the solenoid input terminal 100 of the relay 58. This, of course, causes the solenoid of the relay 58 to be actuated and the switch terminals 108 and 112 of the relay 58 to be bridged thereby also electrically connecting the solenoid terminals 112 and 114 of the valve 60 and 62 with the battery 92.

Upon actuation of the solenoid of the valve 60 communication between the line 70 and the fuel inlet 14 is terminated and communication is established between the line 72 and the fuel inlet 14. In addition, upon actuation of the solenoid of the valve 62, communication between the return 16 and the line 80 is terminated and the return 16 is communicated with the line 62.

Therefore, almost instantaneously with operation of the compressor 26 by actuation of the handle 40, the internal switch of the pressurestat 54 is closed to bridge the terminals or contacts 104 and 106 and the solenoids of the valves 60 and 62 are actuated to supply fuel to the engine 12 from the auxiliary fuel tank 64 instead of from the primary fuel tank 24. Thus, the amount of fuel used during operation of the compressor 26 may be readily ascertained, either by measurement by the amount of fuel which is required to subsequently fill the tank 64 or by a proportioning fuel flow meter connected between the lines 72 and 82.

It is pointed out in some instances, the compressor 26 may supply air under pressure to the interior of a liquid tank trailer being pulled by the tractor and that the pressurized air may be utilized to pump or unload the liquid from the tank trailer to a point of discharge. Further, the compressed air from the compressor may be supplied to a bulk material tanker and utilized to discharge or unload the bulk material from that trailer. Further, the pressurestat may be used to sense hydraulic pressure generated by a hydraulic pump driven by a power take off receiving its motive power from the engine 12 and engaged by the operating handle 40. Also, the pressurestat 54 may be actuated responsive to operation of other types of auxiliary power systems and may even be operative to sense reduction in pressure responsive to operation of such other auxiliary power systems.

Figure 2:
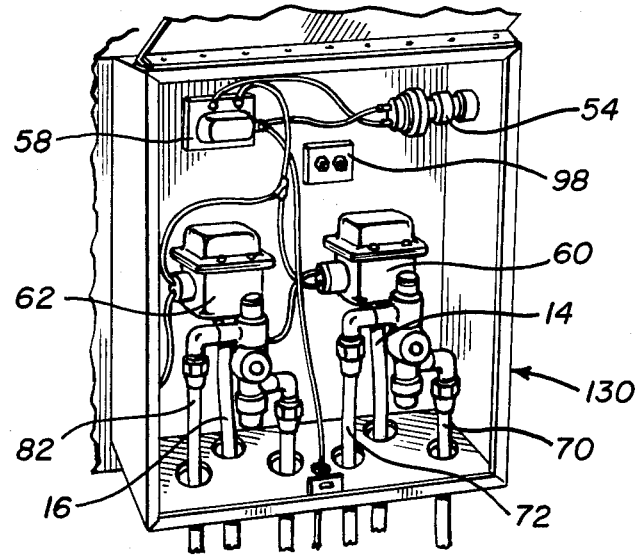
FIG. 2 is a fragmentary elevational view of the lockable enclosure housing portion of the instant invention in which the operating and control components of the instant invention are housed, the cover of the housing being illustrated in the open position.
Figure 3:
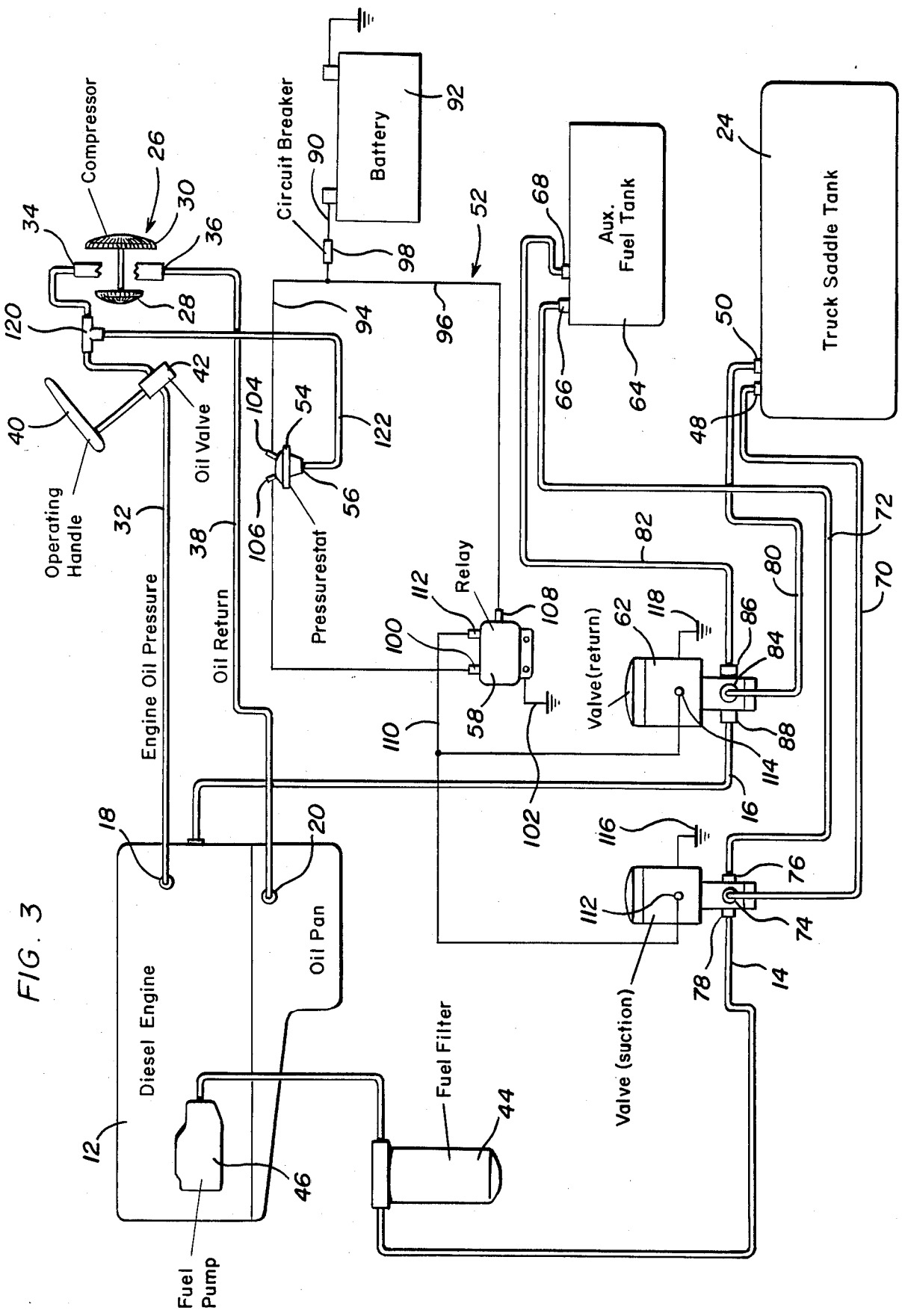
FIG. 3 is a diagrammatic view of the fuel diversion system.

From FIGS. 1 and 2 of the drawing, it may be seen that the tractor 10 mounts a security housing referred to in general by the reference numeral 130 therefrom including an openable closure door 132 which may be locked within the closed position. The pressurestat 54, relay 58 and valves 60 and 62 are contained within the housing and thus may be secured therein against tampering. Further, the auxiliary fuel tank 64 may be provided with a locking closure therefor in order to prevent fuel from being directly transfered from the fuel tank 64 to either of the saddle tanks 22 comprising a part of the primary fuel tank 24 illustrated in FIG. 3.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a load carrying vehicle equipped with a combustion engine prime mover including a fuel inlet and a fuel return and wherein primary and secondary fuel tanks are provided for supplying fuel to the fuel inlet and the vehicle also includes manually actuatable auxiliary load unloading equipment driven at least indirectly from said prime mover only when said vehicle is stationary and initiation of operation of said auxiliary equipment directly results in a pressure difference in a fluid pressure line, said vehicle including said first and second pairs of fuel supply and fuel return lines extending between said primary and secondary tanks, respectively, and said fuel inlet and fuel outlet; the improvement comprising a pair of separate first and second valve means, said first valve means being connected between said supply lines and said fuel outlet, said second valve means being connected between said return lines and said fuel return, said first and second valve means including normal and actuated modes, said first valve means, when in said normal mode, communicating the supply line of said first pair of lines with said fuel inlet and blocking communication of the supply line of said second pair of lines with said inlet, said second valve means, when in said normal mode, communicating said fuel return with the return line of said primary fuel tank and blocking communication of said fuel return with the return line of said secondary tank, said first valve means, when in said actuated mode, communicating the supply line of said auxiliary tank with said fuel inlet and blocking communication of the supply line of said primary tank with said fuel inlet, said second valve means, when in said actuated mode, communicating said fuel return with the return line of said secondary tank and the blocking communication between said fuel return and the fuel return line of said primary tank, said first and second valve means including actuating means therefore for simultaneously actuating said first and second valve means, and control means operative to sense said pressure difference in response to actuation of said auxiliary equipment to actuate said actuating means and to place said first and second valve means in said actuated modes.

2. The combination of claim 1 wherein said auxiliary equipment includes an engine exhaust driven turbine, said control means including an actuator for diverting engine exhaust gases to said turbine, said engine including a loop-type engine oil pressure supply and return line in which said turbine is serially connected for receiving engine lubricating oil from said engine, said line including a flow control valve serially connected therein on the upstream side of said turbine, said control means also being operative to open said control valve as said exhaust gases are diverted to said turbine, said valve means comprising electrically actuatable valves, an electric circuit electrically connecting said valves to the electrical system of said vehicle, said control means further including a pressure actuated control switch serially connected in said circuit and communicated with said supply and return line intermediate said flow control valve and said turbine.

3. The combination of claim 1 wherein said primary tank comprises a pair of selectively usable primary tanks.

4. The combination of claim 1 wherein said control means is enclosed, entirely, within a lockable closure housing.

5. In combination with a load carrying vehicle equipped with a combination engine prime mover having a fuel inlet and including primary and secondary fuel tanks for supplying fuel to said inlet and further wherein the vehicle includes manually actuatable auxiliary load unloading equipment driven at least indirectly from said prime mover only when said vehicle is stationary and initiation of operation of said auxiliary equipment directly results in a fluid pressure difference in a fluid pressure line, said vehicle including first and second supply lines extending between said primary and secondary tanks and said inlet, valve means operatively connecting said supply lines to said inlet, said valve means including normal and actuated modes, said valve means, when said normal mode, communicating said first line with said inlet and blocking communication of said second line with said inlet, said valve means, when in said actuated mode, communicating said second line with inlet and blocking communication of said first line with said inlet, said valve means including actuating means therefor, control means operative to actuate said actuating means, said control means being operative to actuate said actuating means responsive to said pressure difference in said fluid pressure line.

6. The combination of claim 5 wherein said actuating means, control means and valve means are enclosed within a lockable housing therefor on said vehicle.

7. The combination of claim 6 wherein said auxiliary equipment includes an exhaust driven turbine and said fluid pressure line includes an engine oil pressure and return line extending from said engine to said turbine and from said turbine back to said engine, said control means including a control selectively operable to divert exhaust gases from said engine to said turbine and a flow control valve serially connected in said engine oil pressure and return line upstream from said turbine, said control also including means operative to open said flow control valve as said exhaust gases are diverted to said turbine, said control means being responsive to an increase in said oil pressure and return line intermediate said flow control valve and said turbine.

8. In combination with a vehicle equipped with a combustion engine prime mover having a fuel inlet and including primary and secondary fuel tanks for supplying fuel to said inlet and further wherein the vehicle includes auxiliary load unloading equipment driven at least indirectly from said prime mover only when said vehicle is stationary and operation of said auxiliary equipment directly results in a fluid pressure line, said vehicle including first and second supply lines extending between said primary and secondary tanks and said inlet, valve means operatively connecting said supply lines to said inlet, said valve means including normal and actuated modes, said valve means, when said normal mode, communicating said first line with said inlet and blocking communication of said second line with said inlet, said valve means, when in said actuated mode, communicating said second line with inlet and blocking communication of said first line with said inlet, said valve means including acutating means therefor, control means operative to acutate said actuating means, said control means being operative to actuate said actuating means responsive to said pressure difference in said fluid pressure line, said auxiliary equipment including an exhaust driven turbine and said fluid pressure line including an engine oil pressure and return line extending from said engine to said turbine and from said turbine back to said engine, said control means including a control selectively operable to divert exhaust from said engine to said turbine and a flow control valve serially connected in said engine oil pressure and return line upstream from said turbine, said control also including means operative to open said flow control valve as said exhaust gases are diverted to said turbine, said control means being responsive to an increase in said oil pressure and return line intermediate said flow control valve and said turbine.

* * * * *